(12) United States Patent
Li et al.

(10) Patent No.: US 7,450,383 B1
(45) Date of Patent: Nov. 11, 2008

(54) REDUNDANT POWER SUPPLY SYSTEM

(75) Inventors: Ran Li, Amphur Muang (TH); Chanwit Prasantnakorn, Amphur Muang (TH); Chin-Huat Lim, Amphur Muang (TH)

(73) Assignee: Delta Electronics (Thailand) Public Co., Ltd., Samutprakarn (TH)

( * ) Notice: Subject to any disclaimer, the term of this patent is extended or adjusted under 35 U.S.C. 154(b) by 35 days.

(21) Appl. No.: 11/764,346

(22) Filed: Jun. 18, 2007

(30) Foreign Application Priority Data

Apr. 27, 2007 (TW) .............................. 96115174 A (51) Int. Cl.
*H05K 7/20* (2006.01)
*H05K 7/16* (2006.01)

(52) U.S. Cl. ........................ 361/695; 361/716; 361/724; 361/727; 361/728; 361/729; 363/141

(58) Field of Classification Search ........................ None
See application file for complete search history.

(56) References Cited

U.S. PATENT DOCUMENTS

| | | | | |
|---|---|---|---|---|
| 4,652,769 A | * | 3/1987 | Smith et al. .................... 307/31 |
| 4,731,703 A | * | 3/1988 | Tsukaguchi et al. ......... 361/727 |
| 5,761,045 A | * | 6/1998 | Olson et al. .................. 361/726 |
| 5,808,876 A | * | 9/1998 | Mullenbach et al. ........ 361/788 |
| 5,969,938 A | * | 10/1999 | Byrne et al. ................. 361/678 |
| 6,046,921 A | * | 4/2000 | Tracewell et al. ........... 363/141 |
| 6,201,319 B1 | * | 3/2001 | Simonelli et al. ............. 307/26 |
| 6,205,029 B1 | * | 3/2001 | Byrne et al. ................. 361/724 |
| 6,445,586 B1 | * | 9/2002 | Chou ........................... 361/725 |
| 6,937,461 B1 | * | 8/2005 | Donahue, IV ............... 361/622 |
| 6,947,287 B1 | * | 9/2005 | Zansky et al. ............... 361/731 |
| 7,009,839 B2 | * | 3/2006 | Clinard ....................... 361/685 |

\* cited by examiner

*Primary Examiner*—Boris L Chervinsky
(74) *Attorney, Agent, or Firm*—Kirton & McConkie; Evan R. Witt (57) ABSTRACT

A redundant power supply system includes a system cabinet, a first power supply apparatus, a second power supply apparatus and a power converting circuit board. The system cabinet at least includes a first receptacle and a second receptacle. The first power supply apparatus has a first connection interface. The second power supply apparatus has a second connection interface. The power converting circuit board is disposed inside the system cabinet and includes a first insertion slot, a second insertion slot and a power converting circuit. A voltage outputted from the first power supply apparatus and/or the second power supply apparatus is converted by the power converting circuit into a regulated voltage when the first connection interface of the first power supply apparatus and the second connection interface of the second power supply apparatus are inserted into the first insertion slot and the second insertion slot, respectively.

16 Claims, 10 Drawing Sheets

REDUNDANT POWER SUPPLY SYSTEM

FIELD OF THE INVENTION

The present invention relates to a power supply system, and more particularly to a redundant power supply system.

BACKGROUND OF THE INVENTION

Power supply apparatuses are essential for many electronic appliances such as personal computers, industrial computers, servers, communication products or network products. Normally, the power supply apparatus may provide stable electricity to the electronic appliance. In a case that the power supply apparatus has a breakdown, the electronic appliance is possibly damaged or the data stored in the electronic appliance is lost. For enhancing capacity and reliability of power supply, a redundant power supply system has been proposed. The redundant power supply system includes a plurality of separated power supply apparatuses, which are electrically to each other and contained in a system cabinet. During operation of the redundant power supply system, individual power supply apparatuses share responsibility for providing electricity to the electronic appliance. If one of the power supply apparatuses has a breakdown and fails to normally provide electricity, the others could continuously provide electricity to the loads.

Figure 1A:
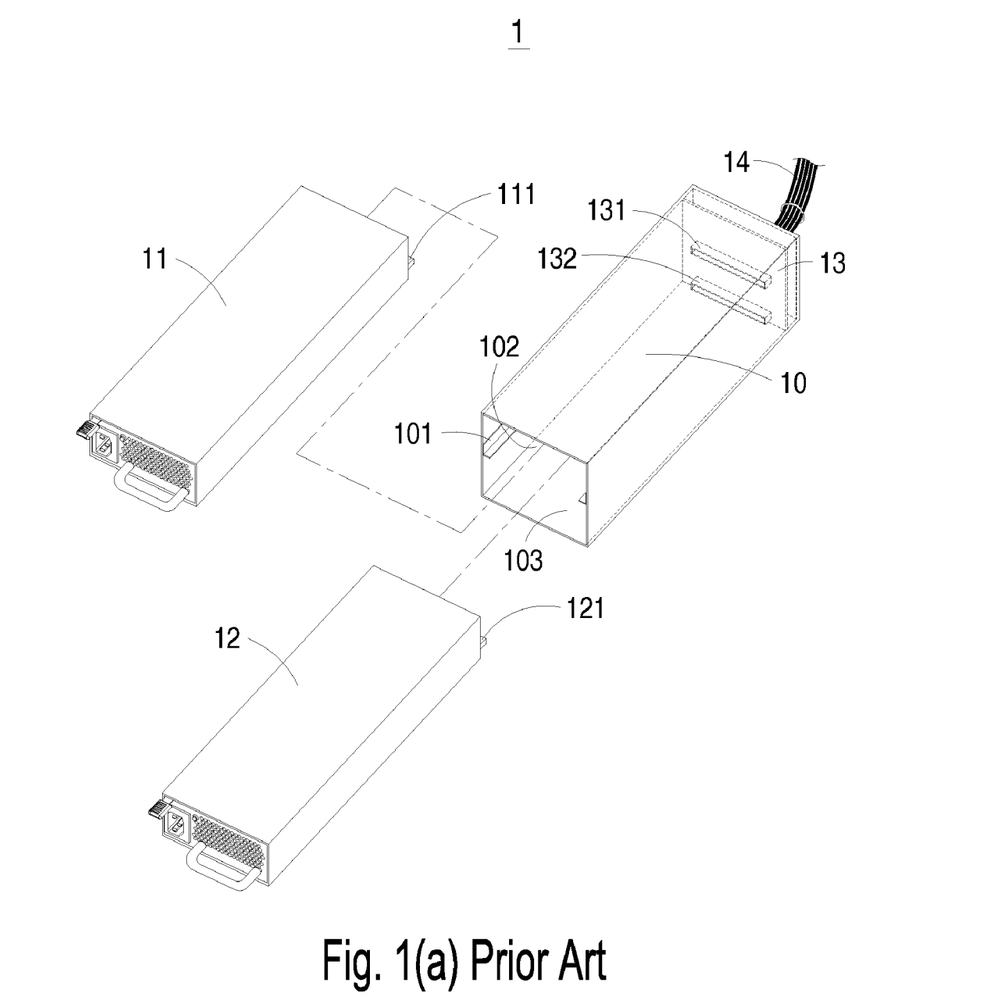
FIG. 1(a) is a schematic exploded view of a conventional redundant power supply system.

Referring to FIG. 1(a), a schematic exploded view of a conventional redundant power supply system is illustrated. The redundant power supply system 1 principally includes a system cabinet 10, a first power supply apparatus 11 and a second power supply apparatus 12. The system cabinet 10 includes a first receptacle 102 and a second receptacle 103, which are separated by a partition plate 101. The first power supply apparatus 11 and the second power supply apparatus 12 are accommodated within the first receptacle 102 and the second receptacle 103, respectively. The redundant power supply system 1 further includes a backside plate 13 inside the system cabinet 10. A first insertion slot 131 and a second insertion slot 132 are disposed on the backside plate 13. The first connection interface 111 of the first power supply apparatus 11 and the second connection interface 121 of the second power supply apparatus 12 are respectively inserted into the first insertion slot 131 and the second insertion slot 132 so as to be electrically connected to the backside plate 13. A power cable 14 is extended from the outer surface of the backside plate 13, so that the electricity provided by the redundant power supply system 1 is transmitted to an electronic appliance via the power cable 14.

Since the backside plate 13 of the redundant power supply system 1 is an adapter interface for transferring the electricity provided by the first power supply apparatus 11 and the second power supply apparatus 12. Under this circumstance, no power converting circuit is arranged on the backside plate 13. For converting input voltages into regulated voltages, the first power supply apparatus 11 and the second power supply apparatus 12 further include power converting circuits such as AC-to-DC converting circuits or DC-to-DC converting circuits. When the first connection interface 111 of the first power supply apparatus 11 and the second connection interface 121 of the second power supply apparatus 12 are respectively inserted into the first insertion slot 131 and the second insertion slot 132 of the backside plate 13, the power converting circuits inside the first power supply apparatus 11 and the second power supply apparatus 12 are electrically to the electronic appliance. As a consequence, the first power supply apparatus 11 and the second power supply apparatus 12 are relatively long. In a case that one of the power supply apparatuses has a breakdown and fails to normally provide electricity, the other power supply apparatus could continuously provide electricity to the electronic appliance. However, there are still some drawbacks. For example, the heat generated from the backside plate 13 fails to be effectively dissipated away. In addition, the airflows driven by the fans inside the power supply apparatuses are impeded by the backside plate 13. Since no additional airflow is provided in the system cabinet 10, the redundant power supply system 1 has insufficient heat-dissipating efficiency, lowered power-converting efficiency or shortened life.

Figure 1B:
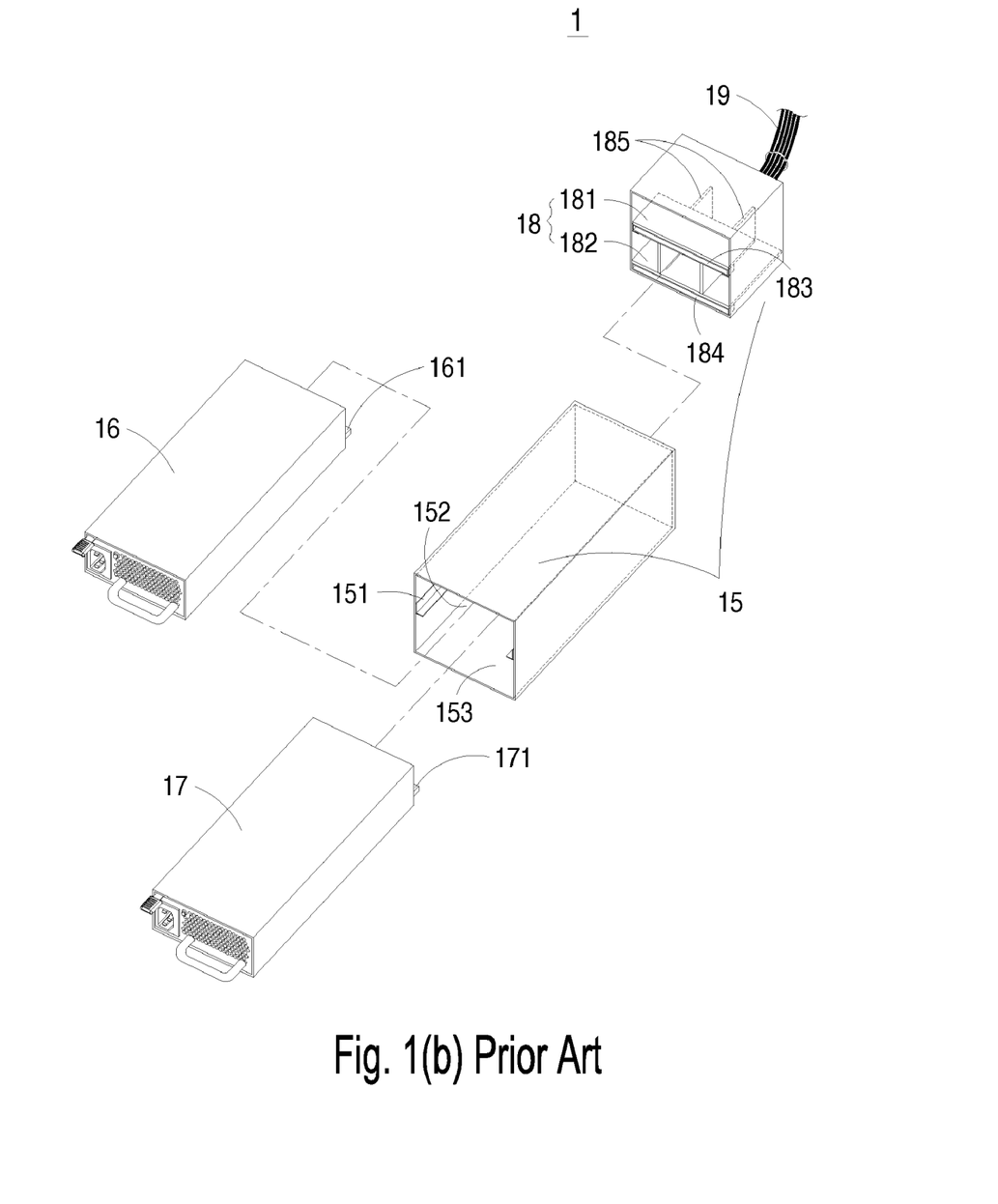
FIG. 1(b) is a schematic exploded view of another conventional redundant power supply system.

Referring to FIG. 1(b), a schematic exploded view of another conventional redundant power supply system is illustrated. The redundant power supply system 1 principally includes a system cabinet 15, a first power supply apparatus 16 and a second power supply apparatus 17. The system cabinet 15 includes a first receptacle 152 and a second receptacle 153, which are separated by a partition plate 151. The first power supply apparatus 16 and the second power supply apparatus 17 are accommodated within the first receptacle 152 and the second receptacle 153, respectively. The redundant power supply system 1 further includes a backside plate member 18 inside the system cabinet 15. The backside plate member 18 includes a first backside plate 181 and a second backside plate 182. A first insertion slot 183 and a second insertion slot 184 are disposed on the first backside plate 181 and the second backside plate 182, respectively. The first connection interface 161 of the first power supply apparatus 16 and the second connection interface 171 of the second power supply apparatus 17 are respectively inserted into the first insertion slot 183 and the second insertion slot 184 so as to be electrically connected to the first backside plate 181 and the second backside plate 182. The first backside plate 181 and the second backside plate 182 are parallel with the first power supply apparatus 16 and the second power supply apparatus 17, respectively. The first backside plate 181 and the second backside plate 182 are electrically to each other via plural circuit boards 185. The first backside plate 181, the second backside plate 182 and the circuit boards 185 cooperatively form a power converting circuit. A power cable 19 is extended from the outer surface of the second backside plate 182, so that the electricity provided by the redundant power supply system 1 is transmitted to an electronic appliance via the power cable 19.

Although the first backside plate 181, the second backside plate 182 and the circuit boards 185 cooperatively form a power converting circuit, there are still some drawbacks. Since the first backside plate 181 and the second backside plate 182 are respectively parallel with the first power supply apparatus 16 and the second power supply apparatus 17, the overall length of the redundant power supply system 1 fails to be further reduced. In addition, the configuration of the redundant power supply system 1 shown in FIG. 1(b) is very complicated and difficult to assemble. Likewise, although the other power supply apparatus could continuously provide electricity to the electronic appliance if one power supply apparatus has a breakdown, the heat generated from the backside plates fails to be effectively dissipated away. Since no additional airflow is provided in the system cabinet 15, the redundant power supply system 1 has insufficient heat-dissipating efficiency.

In views of the above-described disadvantages resulted from the conventional method, the applicant keeps on carving unflaggingly to develop a redundant power supply system according to the present invention through wholehearted experience and research.

SUMMARY OF THE INVENTION

It is an object of the present invention to provide a redundant power supply system having a scale-down size and enhanced heat-dissipating efficiency.

Another object of the present invention provides a redundant power supply system, in which a power converting circuit board cooperates with the ventilation holes of the system cabinet to remove heat and shorten the length of the whole system.

A further object of the present invention provides a redundant power supply system, which is electrically connected to many kinds of electronic appliances (e.g. personal computers, industrial computers, servers, communication products or network products) via electronic connectors of different specifications.

In accordance with an aspect of the present invention, there is provided a redundant power supply system. The redundant power supply system includes a system cabinet, a first power supply apparatus, a second power supply apparatus and a power converting circuit board. The system cabinet at least includes a first receptacle and a second receptacle. The first power supply apparatus has a first connection interface. The second power supply apparatus has a second connection interface. The power converting circuit board is disposed inside the system cabinet and includes a first insertion slot, a second insertion slot and a power converting circuit. The power converting circuit board is substantially perpendicular to the length directions of the first power supply apparatus and the second power supply apparatus. A voltage outputted from the first power supply apparatus and/or the second power supply apparatus is converted by the power converting circuit into a regulated voltage when the first connection interface of the first power supply apparatus and the second connection interface of the second power supply apparatus are inserted into the first insertion slot and the second insertion slot, respectively.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
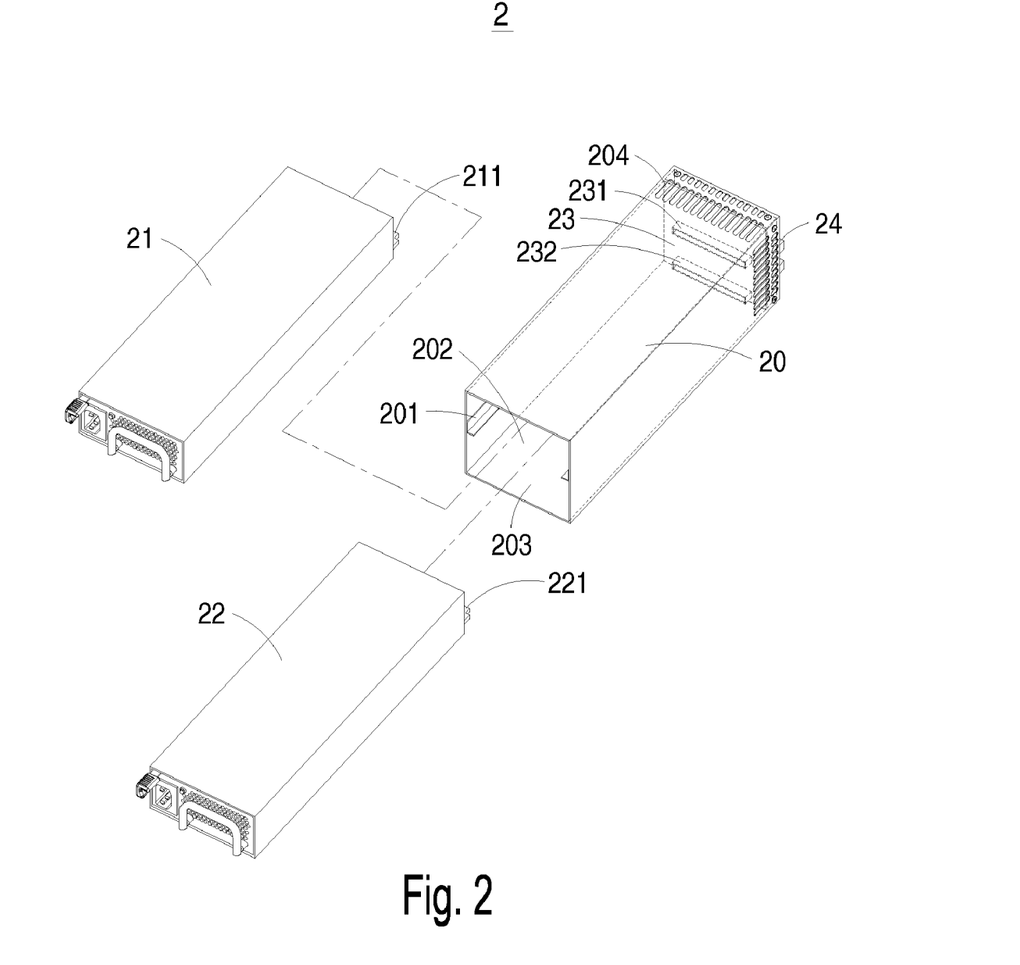
FIG. 2 is a schematic exploded view of a redundant power supply system according to a preferred embodiment of the present invention.

Referring to FIG. 2, a schematic exploded view of a redundant power supply system according to a preferred embodiment of the present invention is illustrated. The redundant power supply system 2 of FIG. 2 principally includes a system cabinet 20, a first power supply apparatus 21 and a second power supply apparatus 22. The system cabinet 20 includes a first receptacle 202 and a second receptacle 203, which are separated by a partition plate 201. The first power supply apparatus 21 and the second power supply apparatus 22 may be accommodated within the first receptacle 202 and the second receptacle 203, respectively. That is, the power supply apparatuses 21 and 22 are swappable to be embedded into the receptacles 202 and 203, respectively. The redundant power supply system 2 further includes a power converting circuit board 23 inside the system cabinet 20. For example, the power converting circuit board 23 include a DC/DC converting circuit. The power converting circuit board 23 is disposed on the inner surface of the backside of the system cabinet 20 and substantially perpendicular to the length direction of the system cabinet 20. The power converting circuit board 23 further includes a first insertion slot 231 and a second insertion slot 232, which are mounted on a first surface of the power converting circuit board 23. The first connection interface 211 of the first power supply apparatus 21 and the second connection interface 221 of the second power supply apparatus 22 are respectively inserted into the first insertion slot 231 and the second insertion slot 232 so as to be electrically connected to the power converting circuit board 23. In some embodiments, the first connection interface 211 and the second connection interface 221 are edge connectors, which are respectively disposed at edges of circuit boards (not shown) inside the first power supply apparatus 21 and the second power supply apparatus 22. At least a surface of the system cabinet 20 further includes plural ventilation holes 204 in the vicinity of the power converting circuit board 23. The airflow inhaled by the fans inside the first power supply apparatus 21 and the second power supply apparatus 22 may also remove a portion of heat from the power converting circuit board 23, and the heated air is exhausted through the ventilation holes 204 in order to enhance the heat-dissipating efficiency.

Figure 3A:
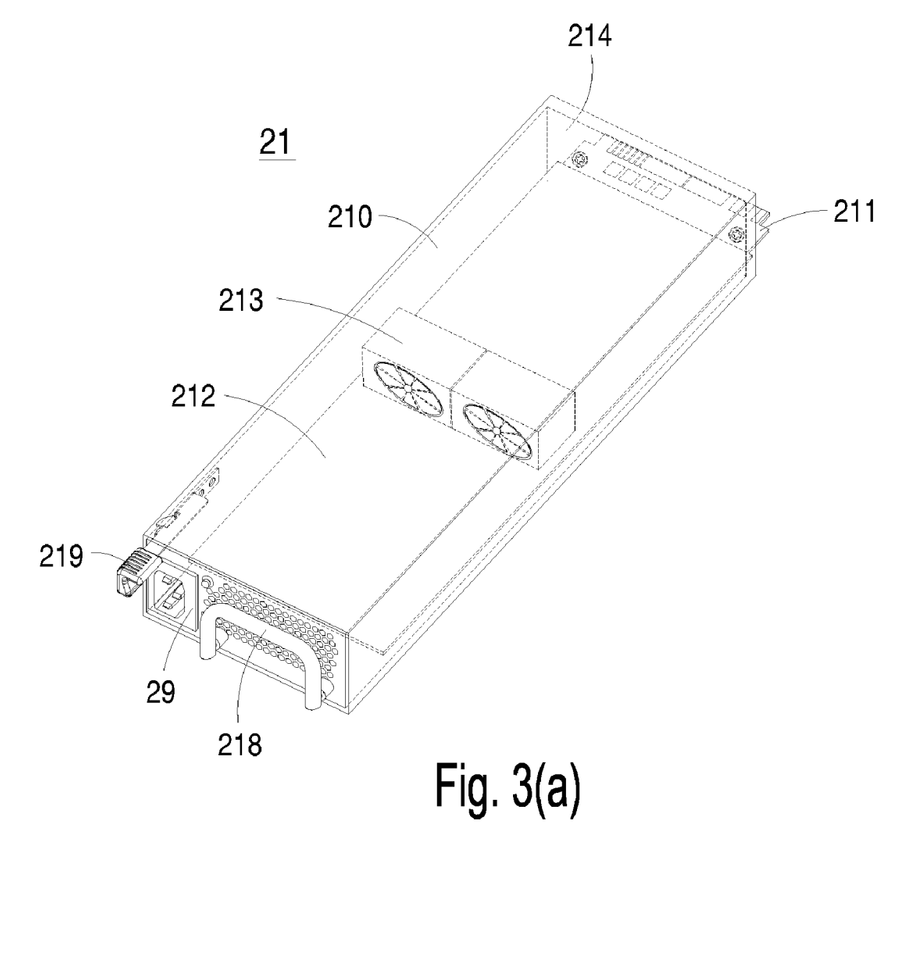
FIGS. 3(a) and 3(b) are schematic assembled views of the first power supply apparatus of FIG. 2 taken from different viewpoints.
Figure 3B:
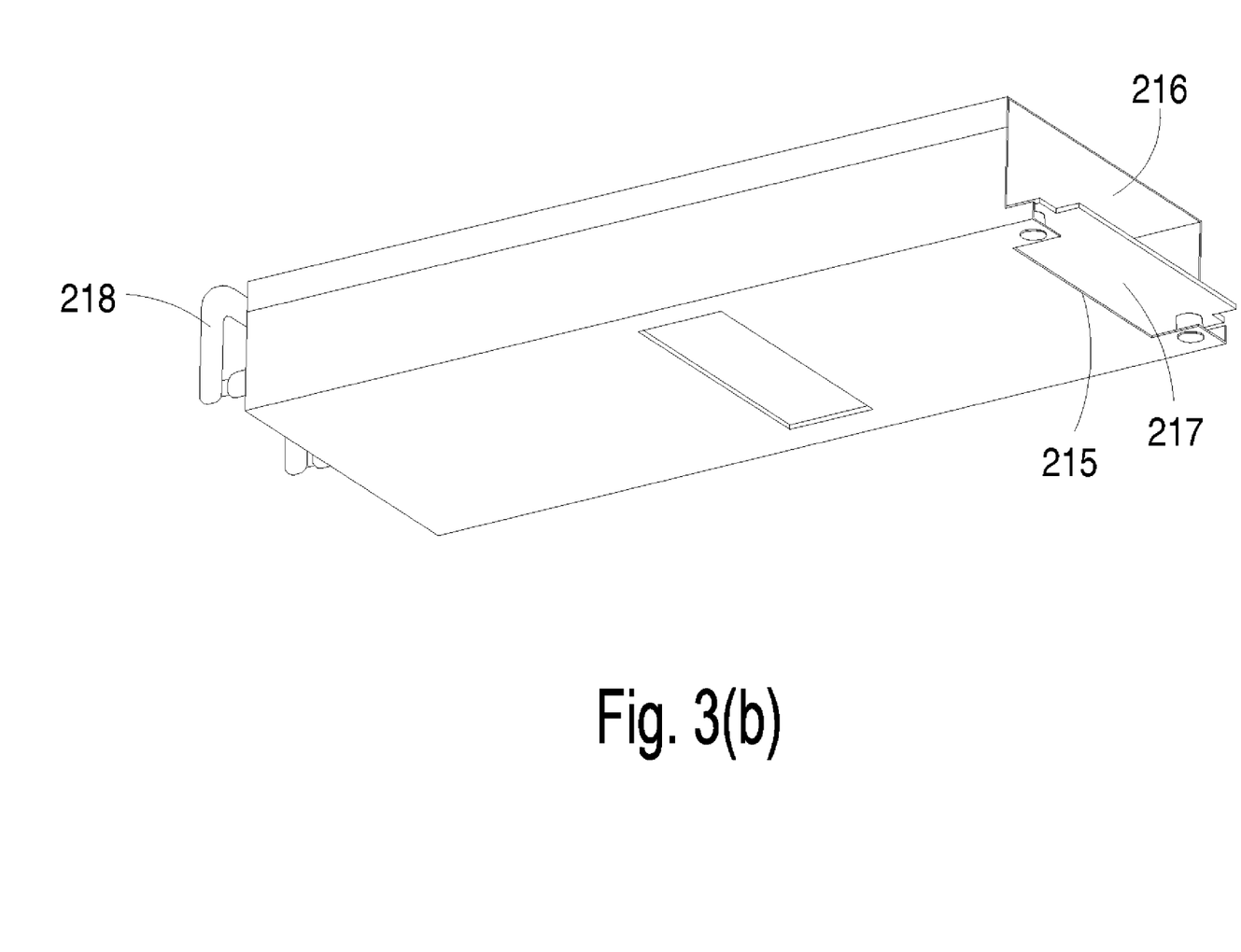
Figure 6:
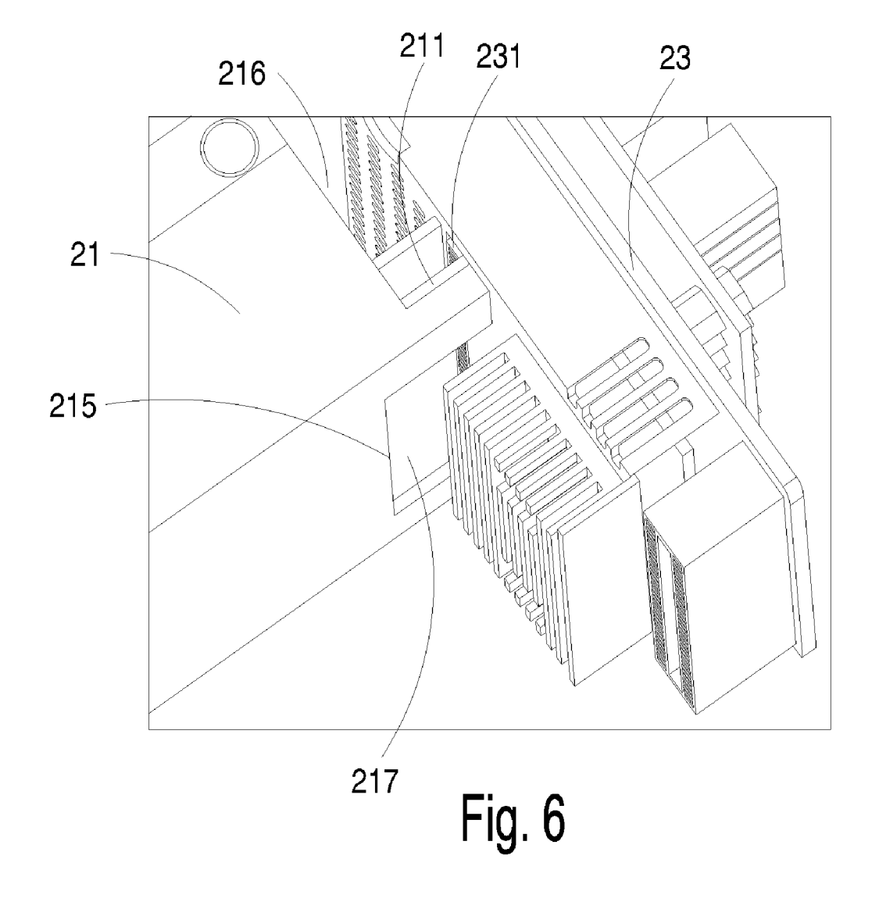
FIG. 6 schematically illustrates that the first connection interface of the first power supply apparatus is inserted into the first insertion slot of the power converting circuit board.

FIGS. 3(a) and 3(b) are schematic assembled views of the first power supply apparatus of FIG. 2 taken from different viewpoints. The configuration of the second power supply apparatus 22 is substantially identical to that of the first power supply apparatus 21. For clarification, only the first power supply apparatus 21 is described. As shown in FIGS. 2, 3(a) and 3(b), the first power supply apparatus 21 principally includes a casing 210, a main circuit board 212 and a fan 213. The main circuit board 212 is disposed within the casing 210. An edge of the main circuit board 212 has a first connection interface 211, which is penetrated through an airflow opening 214 of the casing 210. Especially, a perforation (not shown) is disposed in the middle region of the main circuit board 212 for receiving the fan 213 therein, so that the fan 213 is positioned on the middle region of the main circuit board 212. A first airflow channel 216 is cooperatively defined by the upper inner wall of the casing 210 and the upper surface of the main circuit board 212, and a second airflow channel 217 is cooperatively defined by the lower inner wall of the casing 210 and the lower surface of the main circuit board 212. In some embodiments, the first power supply apparatus 21 further includes a handle 218 and a fastening element 219. In response to a pulling force exerted on the handle 218, the first power supply apparatus 21 may be withdrawn from the system cabinet 20 of the redundant power supply system 2. Moreover, after the first power supply apparatus 21 is placed into the first receptacle 202 of the system cabinet 20, the first power supply apparatus 21 is fixed in the system cabinet 20 via the fastening element 219 so as to avoid accidentally swapping the first power supply apparatus 21. Optionally, the first power supply apparatus 21 further includes an AC socket 29, which is disposed at an edge of the main circuit board 212. As shown in FIG. 3(b), the casing 210 of the first power supply apparatus 21 further includes a notch 215 under the first connection interface 211 for facilitating heat dissipation. In a case that the first connection interface 211 is inserted into the first insertion slot 231 of the power converting circuit board 23, as is shown in FIG. 6, the heat generated from the upper portion and the lower portion of the first insertion slot 231 may be removed through the first airflow channel 216 and the second airflow channel 217, respectively. It is noted that, however, those skilled in the art will readily observe that numerous modifications and alterations may be made while retaining the teachings of the invention. For example, the casing 210 of the first power supply apparatus 21 may include an additional notch at the top surface thereof.

Figure 4A:
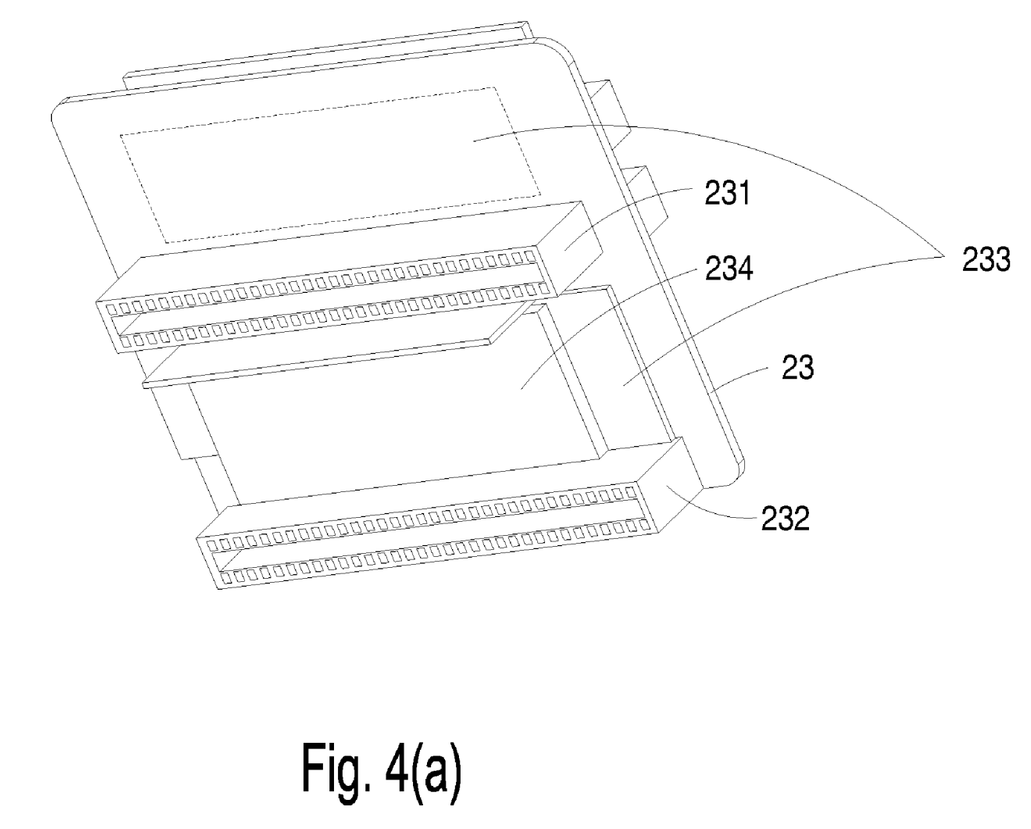
FIGS. 4(a) and 4(b) are schematic assembled views of the power converting circuit board of the redundant power supply system of FIG. 2 taken from different viewpoints.
Figure 4B:
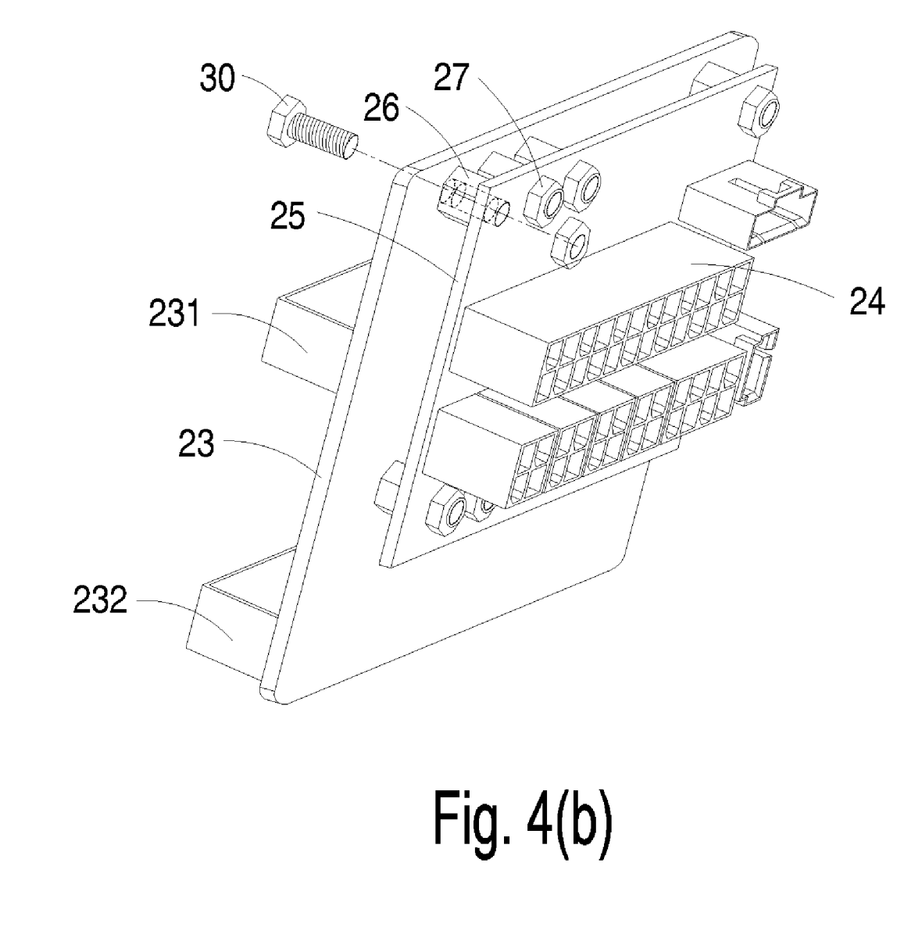
Figure 7:
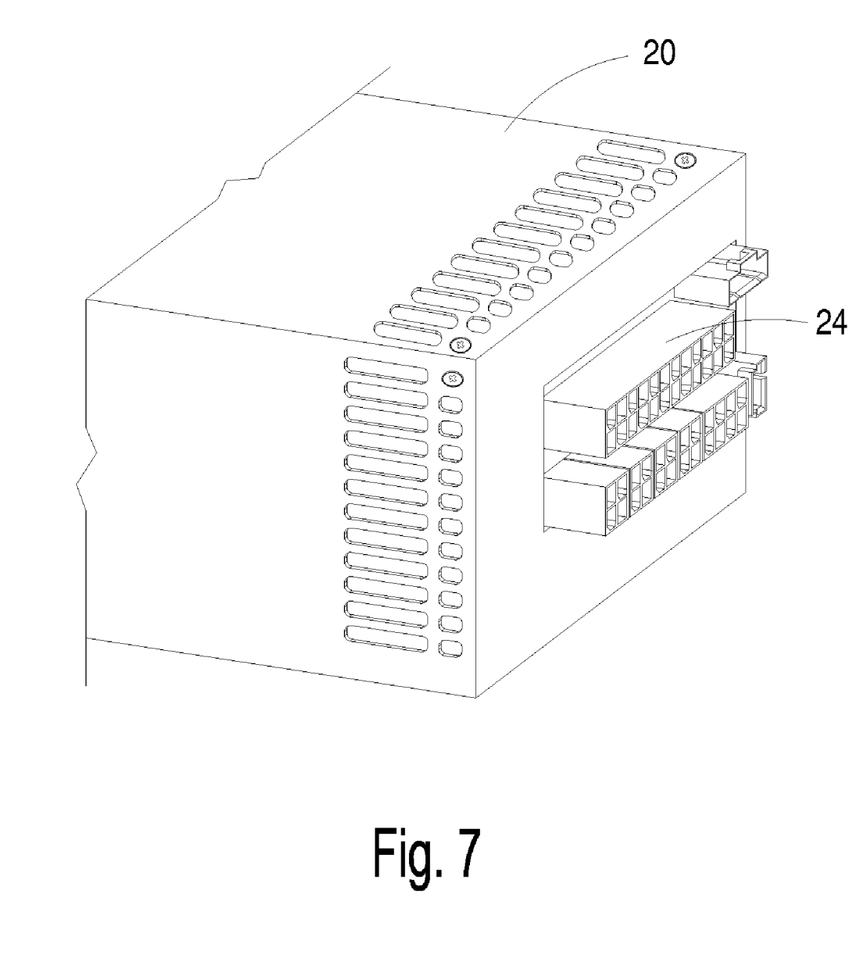
FIG. 7 is a schematic view illustrating electronic connectors of the system cabinet.

FIGS. 4(a) and 4(b) are schematic assembled views of the power converting circuit board of the redundant power supply system of FIG. 2 taken from different viewpoints. As shown in FIGS. 4(a) and 4(b), the power converting circuit board 23 includes the first insertion slot 231, the second insertion slot 232 and a power converting circuit 233. An example of the power converting circuit 233 is a DC/DC converting circuit. By the power converting circuit 233, the voltage outputted from the power supply apparatus 21 or 22 may be converted to a regulated voltage required for powering an electronic appliance. Moreover, at least a heat sink 234 is attached onto a surface of the power converting circuit board 23 for facilitating heat dissipation of the power converting circuit board 23. In some embodiments, the power converting circuit board 23 further includes an auxiliary circuit board 25 on a second surface of the power converting circuit board 23. The second surface is opposed to the first surface. The auxiliary circuit board 25 is fixed onto the power converting circuit board 23 via fixing elements 26. In some embodiments, each fixing element 26 is a screw post having an inner-threaded groove. The power converting circuit board 23 and the auxiliary circuit board 25 have screw holes corresponding to the fixing elements 26. After screws 30 are successively penetrated through corresponding screw holes of the power converting circuit board 23, the inner-threaded grooves of the fixing elements 26 and the screw holes of the auxiliary circuit board 25, the screws 30 are engaged with corresponding screw nuts 27 such that the auxiliary circuit board 25 is fixed onto the power converting circuit board 23. Since the problems resulting from welding operations are avoided, the auxiliary circuit board 25 is easily fastened onto the power converting circuit board 23. Moreover, plural electronic connectors 24 are mounted on the auxiliary circuit board 25 at the surface far away from the power converting circuit board 23. The electronic connectors 24 are electrically connected to the power converting circuit board 23 through the auxiliary circuit board 25 and the fixing elements 26 so that the electrical current can be conveyed from the power converting circuit board 23 to the electronic connectors 24. After the first power supply apparatus 21 is inserted into the system cabinet 20, the electronic connectors 24 are protruded from the backside of the system cabinet 20, as is shown in FIG. 7. Meanwhile, the AC input voltage is converted by the power converting circuit board 23 and the converted voltage is transmitted to electronic appliances through the electronic connectors 24 on the auxiliary circuit board 25. In other words, the redundant power supply system 2 is electrically connected to the electronic appliances via the electronic connectors 24. Exemplary electronic appliances include personal computers, industrial computers, servers, communication products or network products. As previously described in the prior art, since the power cable is extended from the outer surface of the backside plate, the conventional redundant power supply system can be applied to specified electronic appliances. According to the present invention, depending on the types of the electronic connectors 24, the power cable (not shown) for interconnecting the electronic connectors 24 of the redundant power supply system 2 and the electronic appliances are varied. As a consequence, the redundant power supply system 2 may be applied to more electronic appliances as required.

Figure 5:
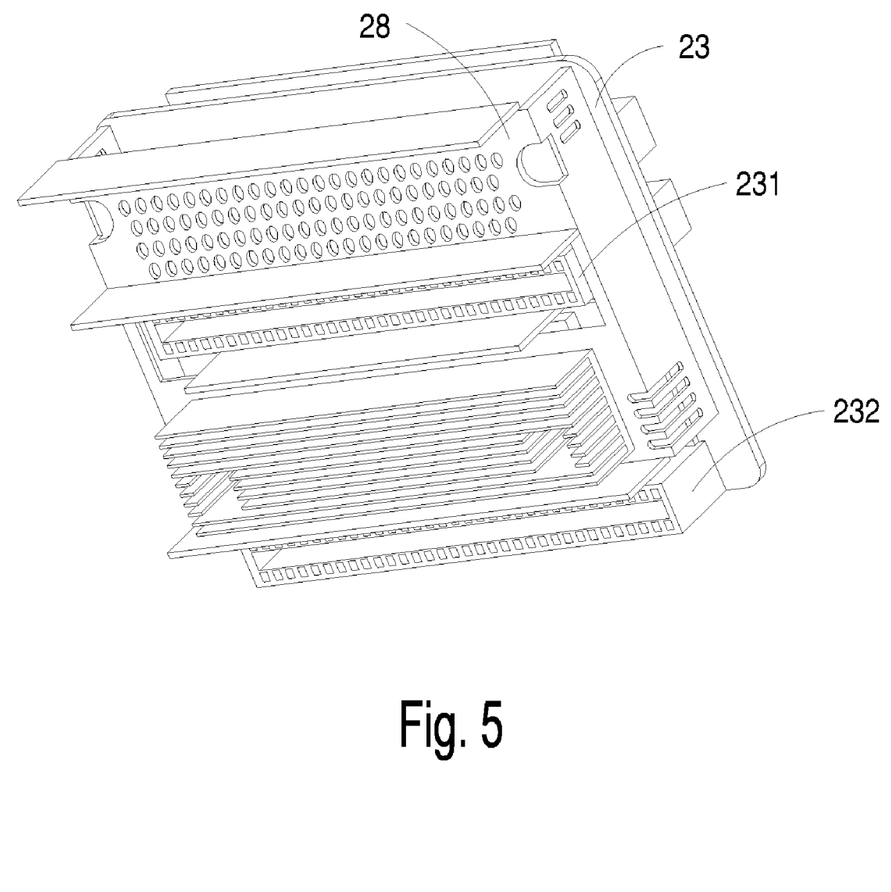
FIG. 5 is a schematic view illustrating a metallic frame mounted on the power converting circuit board.

A further embodiment of the power converting circuit board 23 is illustrated in FIG. 5. The power converting circuit board 23 further includes a metallic frame 28 on the first surface thereof. The region of the first surface of the power converting circuit board 23 excluding the first insertion slot 231 and the second insertion slot 232 is sheltered by the metallic frame 28, thereby preventing from electromagnetic interference (EMI). Furthermore, since the metallic frame 28 is made of high thermally-conductive material, the metallic frame 28 may also facilitate heat dissipation of the power converting circuit board 23 during operations of the first power supply apparatus 21 and the second power supply apparatus 22. In a case that one of the power supply apparatuses 21 and 22 has a breakdown, the airflow provided from the other one of the power supply apparatuses 21 and 22 cooperates with the metallic frame 28 to perform heat dissipation and temperature homogenization, thereby enhancing the heat-dissipating efficiency of the whole system.

Referring to FIG. 6, the first connection interface 211 of the first power supply apparatus 21 is inserted into the first insertion slot 231 of the power converting circuit board 23. Please refer to FIG. 3(a), FIG. 3(b) and also FIG. 6. Since the notch 215 is disposed at the bottom edge of the casing 210 of the first power supply apparatus 21, the airflow driven by the fan 213 inside the casing 210 may be guided to the upper portion and the lower portion of the first insertion slot 231 through the first airflow channel 216 and the second airflow channel 217, respectively. Even if the second power supply apparatus 22 has a breakdown, the airflow driven by the fan 213 may be guided in the vicinity of the second insertion slot 232 of the power converting circuit board 23 through the second airflow channel 217 and the notch 215, thereby enhancing the heat-dissipating efficiency.

In the above embodiments, the first power supply apparatus 21 and the second power supply apparatus 22 are mounted on the power converting circuit board 23 within the redundant power supply system 2. Since the power converting circuit board 23 is substantially perpendicular to the length directions of the power supply apparatuses 21 and 22, the power supply apparatuses 21 and 22 may be shortened in order to scale down the size of the redundant power supply system 2. Moreover, since the power converting circuit board 23 is disposed on the inner surface of the backside of the system cabinet 20, the power converting circuit board 23 may cooperate with the ventilation holes 204 of the system cabinet 20 and the notch 215 of the casing 210 to provide a path for allowing airflow to remove heat of the power converting circuit board 23 even if one of the power supply apparatuses 21 and 22 has a breakdown.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A redundant power supply system comprising:
   a system cabinet at least including a first receptacle and a second receptacle;
   a first power supply apparatus having a first connection interface;
   a second power supply apparatus having a second connection interface; and
   a power converting circuit board disposed inside said system cabinet and including a first insertion slot, a second insertion slot and a power converting circuit, said power converting circuit board being substantially perpendicular to the length directions of said first power supply apparatus and said second power supply apparatus, wherein a voltage outputted from said first power supply apparatus and/or said second power supply apparatus is converted by said power converting circuit into a regulated voltage when said first connection interface of said first power supply apparatus and said second connection interface of said second power supply apparatus are inserted into said first insertion slot and said second insertion slot, respectively.

2. The redundant power supply system according to claim 1 wherein said first receptacle and said second receptacle is separated by a partition plate.

3. The redundant power supply system according to claim 2 wherein said first power supply apparatus and said second power supply apparatus are swappable to be embedded into said first receptacle and said second receptacle, respectively.

4. The redundant power supply system according to claim 1 wherein said power converting circuit is a DC/DC converting circuit.

5. The redundant power supply system according to claim 1 wherein said power converting circuit board is disposed on an inner surface of a backside of said system cabinet.

6. The redundant power supply system according to claim 1 wherein said first connection interface and said second connection interface are edge connectors.

7. The redundant power supply system according to claim 1 wherein said system cabinet further includes plural ventilation holes in the vicinity of said power converting circuit board.

8. The redundant power supply system according to claim 1 wherein each of said first power supply apparatus and said second power supply apparatus includes:
   a casing;
   a main circuit board disposed within said casing, wherein first airflow channel is cooperatively defined by an upper inner wall of said casing and an upper surface of said main circuit board, and a second airflow channel is cooperatively defined by a lower inner wall of said casing and a lower surface of said main circuit board; and
   a fan disposed in the middle region of said main circuit board.

9. The redundant power supply system according to claim 8 wherein said first connection interface and said second connection interface are penetrated through corresponding airflow openings of said casings of said first power supply apparatus and said second power supply apparatus.

10. The redundant power supply system according to claim 9 wherein said casing further includes a notch at a bottom edge thereof.

11. The redundant power supply system according to claim 1 wherein at least a heat sink is attached onto a surface of said power converting circuit board.

12. The redundant power supply system according to claim 1 wherein said first insertion slot and said second insertion slot are mounted on a first surface of said power converting circuit board, and an auxiliary circuit board is further mounted on a second surface of the power converting circuit board, wherein said second surface is opposed to said first surface.

13. The redundant power supply system according to claim 12 wherein said auxiliary circuit board is fixed onto said power converting circuit board via plural fixing elements.

14. The redundant power supply system according to claim 13 wherein said fixing elements are screw posts having respective inner-threaded grooves, said auxiliary circuit board being fixed onto said power converting circuit board by penetrating screws through said power converting circuit board, said fixing elements and said auxiliary circuit board and engaging said screws with corresponding screw nuts.

15. The redundant power supply system according to claim 13 wherein plural electronic connectors are mounted on said auxiliary circuit board at the surface far away from said power converting circuit board, and said electronic connectors are electrically connected to said power converting circuit board through said auxiliary circuit board and said plural fixing elements.

16. The redundant power supply system according to claim 1 wherein said first insertion slot and said second insertion slot are mounted on a first surface of said power converting circuit board, and a metallic frame is further disposed on said first surface of said power converting circuit board.

* * * * *